(12) United States Patent
de Souza et al.

(10) Patent No.: US 10,944,128 B2
(45) Date of Patent: Mar. 9, 2021

(54) ANODE STRUCTURE FOR SOLID-STATE LITHIUM-BASED THIN-FILM BATTERY

(71) Applicant: International Business Machines Corporation, Armonk, NY (US)

(72) Inventors: Joel P. de Souza, Putnam Valley, NY (US); Yun Seog Lee, White Plains, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 15/474,668

(22) Filed: Mar. 30, 2017

(65) Prior Publication Data
US 2018/0287130 A1    Oct. 4, 2018

(51) Int. Cl.
| | | |
|---|---|---|
| *H01M 10/05* | (2010.01) |
| *H01M 10/0562* | (2010.01) |
| *H01M 10/052* | (2010.01) |
| *H01M 10/04* | (2006.01) |
| *H01M 2/10* | (2006.01) |
| *H01M 4/04* | (2006.01) |
| *H01M 10/0525* | (2010.01) |
| *H01M 10/0585* | (2010.01) |
| *H01M 4/525* | (2010.01) |

(52) U.S. Cl.
CPC ..... *H01M 10/0562* (2013.01); *H01M 2/1094* (2013.01); *H01M 4/0447* (2013.01); *H01M 10/049* (2013.01); *H01M 10/0436* (2013.01); *H01M 10/052* (2013.01); *H01M 10/0525* (2013.01); *H01M 10/0585* (2013.01); *H01M 4/525* (2013.01); *H01M 2220/30* (2013.01); *H01M 2300/0068* (2013.01)

(58) Field of Classification Search
None
See application file for complete search history.

(56) References Cited

U.S. PATENT DOCUMENTS

| | | |
|---|---|---|
| 4,369,237 A | 1/1983 | Goebel |
| 5,939,217 A | 8/1999 | Tamura et al. |
| 5,994,834 A | 11/1999 | Alwan et al. |

(Continued)

FOREIGN PATENT DOCUMENTS

| | | |
|---|---|---|
| CN | 101507024 A | 8/2009 |
| CN | 101771168 A | 7/2010 |

(Continued)

OTHER PUBLICATIONS

"Fuse", Merriam-Webster.com, Web, Aug. 9, 2018, 1 page.

(Continued)

*Primary Examiner* — Ula C Ruddock
*Assistant Examiner* — Tony S Chuo
(74) *Attorney, Agent, or Firm* — Scully, Scott, Murphy & Presser, P.C.; L. Jeffrey Kelly, Esq.

(57) ABSTRACT

A solid-state lithium-based battery is provided in which the formation of lithium islands (i.e., lumps) during a charging/recharging cycle is reduced, or even eliminated. Reduction or elimination of lithium islands (i.e., lumps) can be provided by forming a lithium nucleation enhancement liner between a lithium-based solid-state electrolyte layer and a top electrode of a solid-state lithium based battery.

11 Claims, 4 Drawing Sheets

(56) References Cited

U.S. PATENT DOCUMENTS

| | | |
|---|---|---|
| 6,495,283 B1 | 12/2002 | Yoon et al. |
| 8,236,452 B2 | 8/2012 | Zhamu et al. |
| 8,383,265 B2 | 2/2013 | Kang et al. |
| 8,790,804 B2 | 7/2014 | Deligianni et al. |
| 8,999,571 B2 | 4/2015 | Chiang et al. |
| 2001/0032666 A1 | 10/2001 | Jenson et al. |
| 2002/0071983 A1 | 6/2002 | Rowen et al. |
| 2002/0092558 A1 | 7/2002 | Kim et al. |
| 2004/0131779 A1 | 7/2004 | Haubrich et al. |
| 2004/0131925 A1* | 7/2004 | Jenson .................... H01M 6/40 429/61 |
| 2004/0166409 A1* | 8/2004 | Takada ................ H01M 4/0421 429/218.1 |
| 2005/0064291 A1 | 3/2005 | Sato et al. |
| 2005/0147877 A1* | 7/2005 | Tarnowski .......... H01M 2/0207 429/162 |
| 2005/0191547 A1* | 9/2005 | Konishiike ......... H01M 2/0222 429/137 |
| 2008/0057397 A1* | 3/2008 | Skotheim ............ H01M 2/1673 429/212 |
| 2008/0213671 A1 | 9/2008 | Kogetsu et al. |
| 2009/0246636 A1 | 10/2009 | Chiang et al. |
| 2009/0258295 A1 | 10/2009 | Niessen et al. |
| 2011/0076542 A1 | 3/2011 | Farmer |
| 2011/0095720 A1 | 4/2011 | Shacklette et al. |
| 2011/0143195 A1 | 6/2011 | Ito et al. |
| 2011/0281160 A1 | 11/2011 | Doi |
| 2011/0294015 A1 | 12/2011 | Pirk et al. |
| 2012/0270114 A1* | 10/2012 | Reynolds ............ H01M 4/0426 429/322 |
| 2013/0089769 A1 | 4/2013 | Proctor et al. |
| 2013/0095381 A1 | 4/2013 | Oukassi et al. |
| 2013/0130066 A1 | 5/2013 | Pytlik et al. |
| 2013/0149593 A1 | 6/2013 | Hayashi et al. |
| 2013/0260183 A1 | 10/2013 | Ellis-Monaghan et al. |
| 2014/0212735 A1 | 7/2014 | Li et al. |
| 2015/0084157 A1 | 3/2015 | Tegen et al. |
| 2015/0280198 A1 | 10/2015 | Weis et al. |
| 2016/0329541 A1 | 11/2016 | Adams et al. |
| 2017/0162854 A1 | 6/2017 | Sugiura |
| 2019/0088991 A1* | 3/2019 | Hegde ............... H01M 10/0562 |

FOREIGN PATENT DOCUMENTS

| | | |
|---|---|---|
| CN | 102301518 A | 12/2011 |
| CN | 104205467 A | 12/2014 |
| CN | 105489845 A | 4/2016 |
| DE | 102011085863 A1 | 5/2013 |
| JP | 2014143008 A | 8/2014 |
| JP | 2015026555 A | 2/2015 |
| KR | 1020070077231 A | 7/2007 |
| KR | 100855081 B1 | 8/2008 |
| WO | 2017105234 A1 | 6/2017 |

OTHER PUBLICATIONS

Office Action dated Aug. 16, 2018 received in a related U.S. Patent Application, namely U.S. Appl. No. 15/481,042.
List of IBM Patents or Patent Applications Treated as Related, dated Nov. 22, 2017, 2 pages.
Zeng, et al., "In situ TEM study of the Li—Au reaction in an electrochemical liquid cell", Faraday Discuss., Jul. 2014, pp. 95-107, 176.
Yan, et al., "Selective deposition and stable encapsulation of lithium through heterogeneous seeded growth", Nature Energy, Feb. 22, 2016, pp. 1-9, Article No. 16010.
Office Action dated Feb. 8, 2019 received in U.S. Appl. No. 15/481,042, Copy Not Enclosed.
Office Action dated Feb. 26, 2019 received in U.S. Appl. No. 15/818,385, Copy Not Enclosed.
Office Action dated Feb. 28, 2019 received in U.S. Appl. No. 15/818,405, Copy Not Enclosed.
Office Action dated Oct. 5, 2018 received in U.S. Appl. No. 15/818,405.
Office Action dated Oct. 5, 2018 received in U.S. Appl. No. 15/818,385.
Office Action dated May 16, 2019 received in U.S. Appl. No. 15/818,350.
Office Action dated May 16, 2019 received in U.S. Appl. No. 15/818,286.
Office Action dated Jun. 5, 2019 received in U.S. Appl. No. 15/818,405.
Office Action dated Jun. 11, 2019 received in U.S. Appl. No. 15/481,042.
Office Action dated Jul. 10, 2019 received in U.S. Appl. No. 15/818,385, Copy Not Enclosed.
Office Action dated Nov. 14, 2019 received in U.S. Appl. No. 15/820,609, copy not enclosed.
International Search Report with the Written Opinion dated Jun. 21, 2018 received in a corresponding foreign application, 9 pages.
Office Action dated Aug. 20, 2020 received in U.S. Appl. No. 15/820,609, Copy Not Enclosed.

* cited by examiner

ANODE STRUCTURE FOR SOLID-STATE LITHIUM-BASED THIN-FILM BATTERY

BACKGROUND

The present application relates to an all solid-state thin-film battery and a method of forming the same. More particularly, the present application relates to a solid-state lithium-based thin-film battery in which lithium lump formation during a charging/recharging cycle is reduced and a method of forming such a thin-film battery.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain potentially flammable and toxic materials that may leak and may be subject to governmental regulations. As such, it is desired to provide an electrical power supply that is safe, solid-state and rechargeable over many charge/discharge life cycles.

One type of an energy-storage device that is small and light weight, contains non-toxic materials and that can be recharged over many charge/discharge cycles is a solid-state, lithium-based battery. Lithium-based batteries are rechargeable batteries that include two electrodes implementing lithium. Some challenges facing conventional solid-state, lithium-based batteries include, for example, volume expansion and/or deformation during cycling, and/or mechanical failure in the thin-film battery due to usable-lithium loss.

Moreover, in conventional solid-state, lithium-based batteries, a high interfacial energy can exist between metallic lithium and the top electrode. Also, localized lithium islands (i.e., lumps) can accumulate instead of a continuous and uniform lithium layer which may facilitate deformation of the electrode and the solid-state electrolyte layer and, can ultimately lead to crack formation within the thin-film battery. As such, there is a need for providing a solid-state, lithium-based battery which has a low interfacial energy between the metallic lithium and top electrode and which can reduce, and in some instances, even eliminate the formation of localized lithium islands (i.e., lumps).

SUMMARY

A solid-state lithium-based battery is provided in which the formation of lithium islands (i.e., lumps) during a charging/recharging cycle is reduced, or even eliminated. The solid-state lithium-based battery of the present application is a thin-film battery that is small and light weight. The term "thin-film battery" is used throughout the present application to denote a battery whose thickness is 100 μm or less. Reduction or elimination of lithium islands (i.e., lumps) can be provided by forming a lithium nucleation enhancement liner between a lithium-based solid-state electrolyte layer and a top electrode of a solid-state lithium based battery.

In one aspect of the present application, a solid-state lithium-based battery is provided. In one embodiment, the solid-state lithium-based battery may include a bottom electrode. A battery material stack is located on a surface of the bottom electrode. The battery material stack includes a lithiated cathode material layer, a lithium-based solid-state electrolyte layer located on the lithiated cathode material layer, and a lithium nucleation enhancement liner located on the lithium-based solid-state electrolyte layer. A top electrode is located on the lithium nucleation enhancement liner of the battery material stack. During charging/recharging, a lithium accumulation region is formed on at least one surface of the lithium nucleation enhancement liner.

In another aspect of the present application, a method of forming a solid-state lithium-based battery is provided. In one embodiment, the method may include forming a patterned sacrificial material on a surface of a bottom electrode, wherein the patterned sacrificial material contains an opening that physically exposes a portion of the surface of the bottom electrode. Next, a lithiated cathode material layer is formed on the patterned sacrificial material and on the physically exposed portion of the surface of the bottom electrode in the opening. A lithium-based solid-state electrolyte layer is then formed on the lithiated cathode material layer, and thereafter a lithium nucleation enhancement liner is formed on the lithium-based solid-state electrolyte layer, and a top electrode is formed on the lithium nucleation enhancement liner. Next, a lift-off process is performed to remove the patterned sacrificial material and materials formed on the patterned sacrificial material from the bottom electrode, while maintaining a material stack on the physically exposed portion of the surface of the bottom electrode. The material stack includes a remaining portion of each of the lithiated cathode material layer, the lithium-based solid-state electrolyte layer, the lithium nucleation enhancement liner and the top electrode. During a charging/recharging process, a lithium accumulation region is formed on at least one surface of the lithium nucleation enhancement liner.

DETAILED DESCRIPTION

Figure 1:
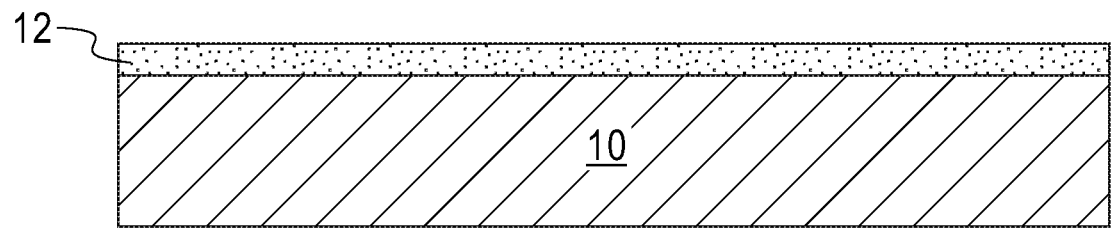
FIG. 1 is a cross sectional view of an exemplary structure including a bottom electrode located on a surface of a substrate that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary structure that can be employed in accordance with an embodiment of the present application. The exemplary structure of FIG. 1 includes a bottom electrode 12 located on a surface of a substrate 10. As is shown, the bottom electrode 12 is typically a continuous layer (without any intentionally formed gaps or breaks) that is present on an entirety of the substrate 10.

The substrate 10 that can be employed in the present application includes any conventional material that is used as a substrate for a solid-state lithium-based battery. In one embodiment, the substrate 10 may include one or more semiconductor materials. The term "semiconductor material" is used throughout the present application to denote a material having semiconducting properties.

Examples of semiconductor materials that may be employed as substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide substrate 10 is a bulk semiconductor substrate. By "bulk" it is meant that the substrate 10 is entirely composed of at least one semiconductor material, as defined above. In one example, the substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In any of the embodiments mentioned above, the semiconductor material that may provide the substrate 10 may be a single crystalline semiconductor material. The semiconductor material that may provide the substrate 10 may have any of the well known crystal orientations. For example, the crystal orientation of the semiconductor material that may provide substrate 10 may be {100}, {110}, or {111}. Other crystallographic orientations besides those specifically mentioned can also be used in the present application.

In another embodiment, the substrate 10 is a metallic material such as, for example, aluminum (Al), aluminum alloy, titanium (Ti), tantalum (Ta), tungsten (W), or molybdenum (Mo).

In yet another embodiment, the substrate 10 is a dielectric material such as, for example, doped or non-doped silicate glass, silicon dioxide, or silicon nitride. In yet a further embodiment, the substrate 10 is composed of a polymer or flexible substrate material such as, for example, a polyimide, a polyether ketone (PEEK) or a transparent conductive polyester. In yet an even further embodiment, the substrate 10 may be composed of a multilayered stack of at least two of the above mentioned substrate materials, e.g., a stack of silicon and silicon dioxide.

The substrate 10 that can be used in the present application can have a thickness from 10 μm to 5 mm. Other thicknesses that are lesser than, or greater than, the aforementioned thickness values may also be used for substrate 10.

In some embodiments, the substrate 10 may have a non-textured (flat or planar) surface. The term "non-textured surface" denotes a surface that is smooth and has a surface roughness on the order of less than 100 nm root mean square as measured by profilometry. In yet another embodiment, the substrate 10 may have a textured surface. In such an embodiment, the surface roughness of the textured substrate can be in a range from 100 nm root mean square to 100 μm root mean square as also measured by profilometry. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the substrate is composed of a plurality of pyramids. In yet another embodiment, the textured surface of the substrate is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the substrate occurs.

The bottom electrode 12 may include any metallic electrode material such as, for example, titanium (Ti), platinum (Pt), nickel (Ni), aluminum (Al) or titanium nitride (TiN). In one example, the bottom electrode 12 includes a stack of, from bottom to top, titanium (Ti), platinum (Pt) and titanium (Ti). The bottom electrode 12 may be formed utilizing a deposition process including, for example, chemical vapor deposition (CVD), plasma enhanced chemical vapor deposition (PECVD), evaporation, sputtering, or plating. The bottom electrode 12 may have a thickness from 10 nm to 500 nm. Other thicknesses that are lesser than, or greater than, the aforementioned thickness values may also be used for the bottom electrode 12.

Figure 2:
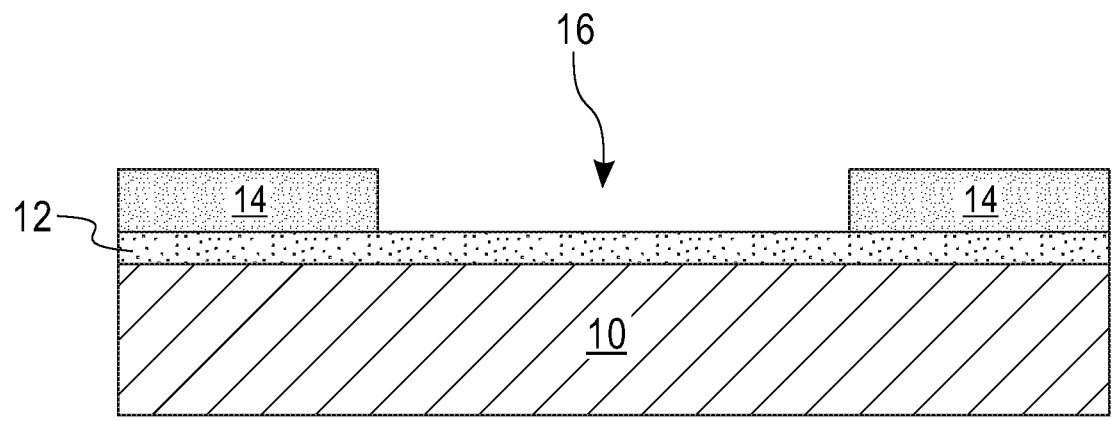
FIG. 2 is a cross sectional view of the exemplary structure of FIG. 1 after forming a patterned sacrificial material on the surface of the bottom electrode, wherein the patterned sacrificial material includes an opening that physically exposes a portion of the surface of the bottom electrode.

Referring now to FIG. 2, there is illustrated the exemplary structure of FIG. 1 after forming a patterned sacrificial material 14 on the surface of the bottom electrode 12, wherein the patterned sacrificial material 14 includes an opening 16 that physically exposes a portion of the surface of the bottom electrode 12. The opening 16 defines an area in which a solid-state lithium-based battery will be subsequently formed. Although the present application describes and illustrates a single opening 16, a plurality of openings 16 can be formed in which each opening of the plurality of openings 16 can define an area for subsequent formation of a solid-state lithium-based battery.

The patterned sacrificial material 14 can be formed by first applying a sacrificial material (not shown) to the physically exposed surface of the bottom electrode 12. In one embodiment, the sacrificial material is a photoresist material. In such an embodiment, the photoresist material may be a positive-tone photoresist material, a negative-tone photoresist material or a hybrid-tone photoresist material. The sacrificial material may be formed utilizing a deposition process such as, for example, spin-on coating or blade coating, followed by a bake step to evaporate any residual solvent(s). The sacrificial material may have a thickness from 100 nm to 20 µm. Other thicknesses that are lesser than, or greater than, the aforementioned thickness values may also be used for the sacrificial material.

The deposited sacrificial material is then patterned. In one embodiment and when the sacrificial material is a photoresist material, the photoresist material may be patterned by exposing the photoresist material to a desired pattern of radiation, and thereafter the exposed photoresist material is developed utilizing a conventional resist developer to provide a patterned sacrificial material 14. When non-photoresist sacrificial materials are used, the non-photoresist sacrificial materials can be patterned by lithography and etching.

In another embodiment, the sacrificial material that provides the patterned sacrificial material 14 is a shadow mask. In such an embodiment, the shadow mask may be a pre-patterned metallic material or a pre-patterned polymeric material. The pre-patterned shadow mask material is attached to the structure shown in FIG. 1 by mechanical force or a removable adhesive.

Figure 3:
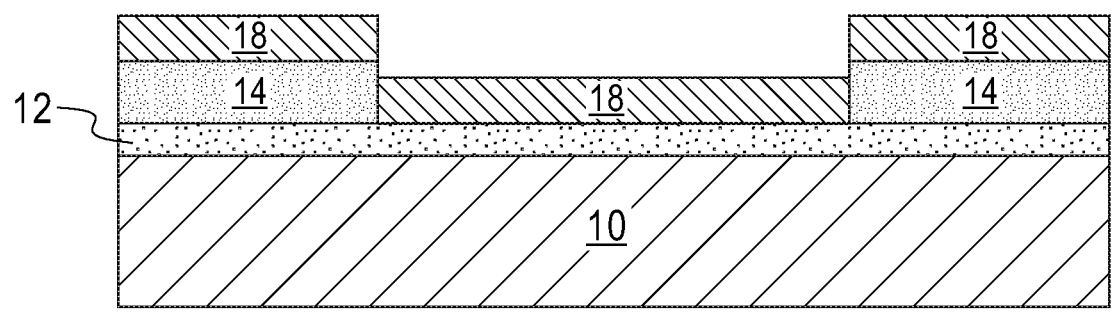
FIG. 3 is a cross sectional view of the exemplary structure of FIG. 2 after forming a lithiated cathode material layer on the patterned sacrificial material and on the physically exposed portion of the bottom electrode in the opening.

Referring now to FIG. 3, there is illustrated the exemplary structure of FIG. 2 after forming a lithiated cathode material layer 18 on the patterned sacrificial material 14 and on the physically exposed portion of the bottom electrode 12 in the opening 16.

The lithiated cathode material layer 18 that can be employed in the present application includes a lithium-based mixed oxide. Examples of lithium-based mixed oxides that may be employed as the lithiated cathode material layer 18 include, but are not limited to, lithium cobalt oxide (LiCoO$_2$), lithium nickel oxide (LiNiO$_2$), lithium manganese oxide (LiMn$_2$O$_4$), lithium vanadium pentoxide (LiV$_2$O$_5$) or lithium iron phosphate (LiFePO$_4$).

The lithiated cathode material layer 18 may be formed utilizing a deposition process such as, sputtering or plating. In one embodiment, the lithiated cathode material layer 18 is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The lithiated cathode material layer 18 may have a thickness from 10 nm to 20 µm. Other thicknesses that are lesser than, or greater than, the aforementioned thickness values may also be used for the lithiated cathode material layer 18.

Figure 4:
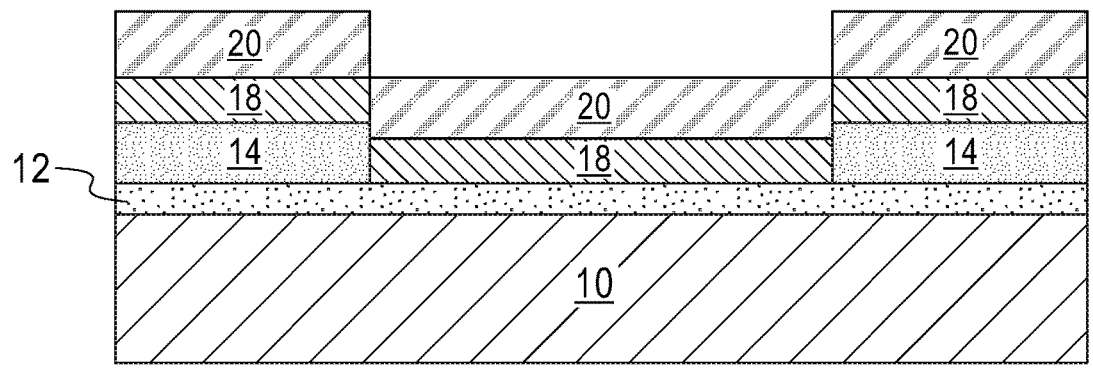
FIG. 4 is a cross sectional view of the exemplary structure of FIG. 3 after forming a lithium-based solid-state electrolyte layer on the lithiated cathode material layer.

Referring now to FIG. 4, there is illustrated the exemplary structure of FIG. 3 after forming a lithium-based solid-state electrolyte layer 20 on the lithiated cathode material layer 18. The lithium-based solid-state electrolyte layer 20 is a solid material that enables the conduction of lithium ions. Such materials may be electrically insulating or ionic conducting. Examples of materials that can be employed as the lithium-based solid-state electrolyte layer 20 include, but are not limited to, lithium phosphorus oxynitride (LiPON) or lithium phosphosilicate oxynitride (LiSiPON).

The lithium-based solid-state electrolyte layer 20 may be formed utilizing a deposition process such as, sputtering or plating. In one embodiment, the lithium-based solid-state electrolyte layer 20 is formed by sputtering utilizing any conventional precursor source material. Sputtering may be performed in the presence of at least a nitrogen-containing ambient. Examples of nitrogen-containing ambients that can be employed include, but are not limited to, N$_2$, NH$_3$, NH$_4$, NO, or NH$_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen (N$_2$) within the nitrogen-containing ambient employed is typically from 10% to 100%, with a nitrogen content within the ambient from 50% to 100% being more typical.

The lithium-based solid-state electrolyte layer 20 may have a thickness from 10 nm to 10 µm. Other thicknesses that are lesser than, or greater than, the aforementioned thickness values may also be used for the lithium-based solid-state electrolyte layer 20.

Figure 5:
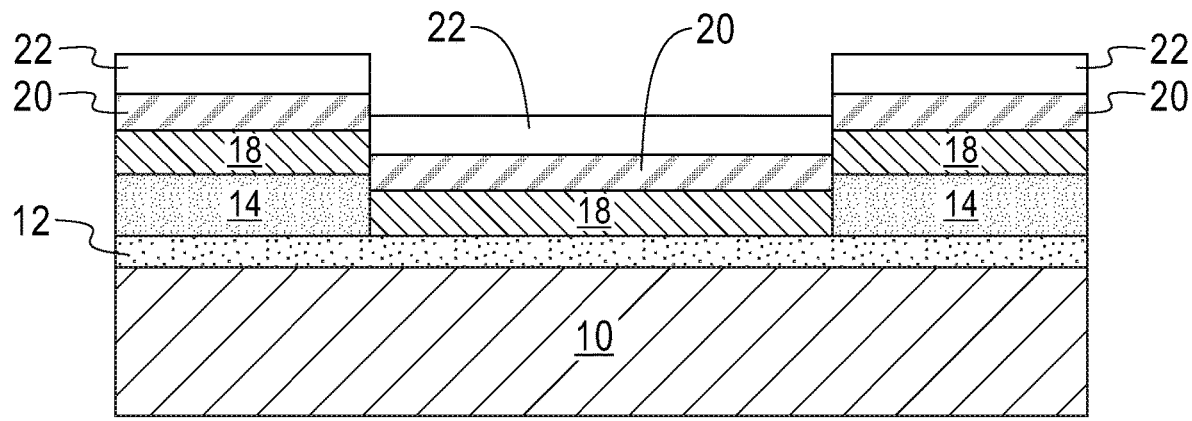
FIG. 5 is a cross sectional view of the exemplary structure of FIG. 4 after forming a lithium nucleation enhancement liner on the lithium-based solid-state electrolyte layer.

Referring now to FIG. 5, there is illustrated the exemplary structure of FIG. 4 after forming a lithium nucleation enhancement liner 22 on the lithium-based solid-state electrolyte layer 20. The lithium nucleation enhancement liner 22 is a continuous layer that covers the entirety of the lithium-based solid-state electrolyte layer 20. The lithium nucleation enhancement liner 22 includes a material that can facilitate the subsequent nucleation of lithium upon performing a charging/recharging process. In one embodiment, lithium nucleation enhancement liner 22 is composed of gold (Au), silver (Ag), zinc (Zn), magnesium (Mg), tantalum (Ta), tungsten (W), molybdenum (Mo), a titanium-zirconium-molybdenum alloy (TZM), or silicon (Si).

The lithium nucleation enhancement liner 22 can be formed utilizing a deposition process. Examples of deposition processes than can be used in forming the lithium nucleation enhancement liner 22 include chemical vapor deposition (CVD), plasma enhanced chemical vapor deposition (PECVD), evaporation, sputtering or plating. The lithium nucleation enhancement liner 22 has a thickness that is greater than 1 nm. In one embodiment, the lithium nucleation enhancement liner 22 has a thickness from 2 nm to 20 nm.

Figure 6:
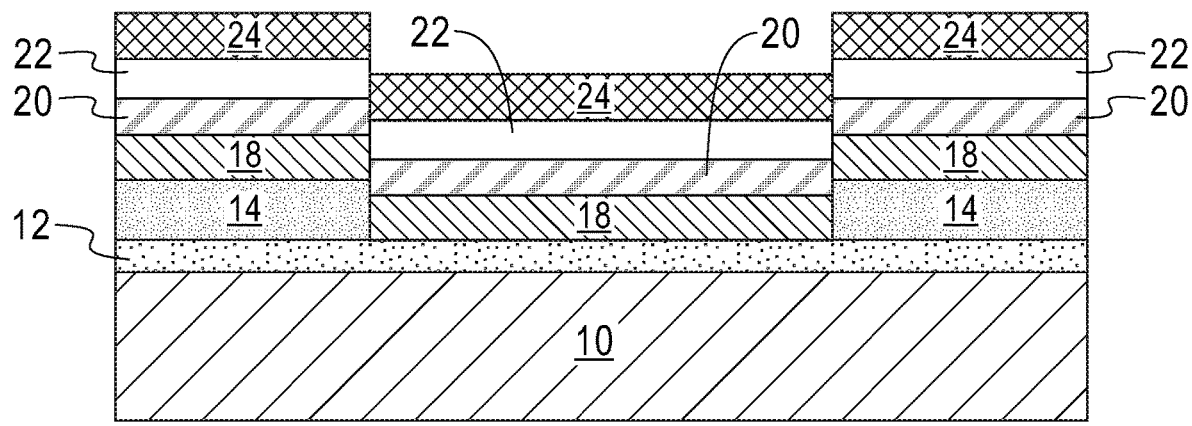
FIG. 6 is a cross sectional view of the exemplary structure of FIG. 5 after forming a top electrode on the lithium nucleation enhancement liner.

Referring now to FIG. 6, there is illustrated the exemplary structure of FIG. 5 after forming a top electrode 24 on the lithium nucleation enhancement liner 22. The top electrode 24 may include any metallic electrode material such as, for example, titanium (Ti), platinum (Pt), nickel (Ni), copper (Cu) or titanium nitride (TiN). In one example, the top electrode 24 includes a stack of, from bottom to top, nickel (Ni) and copper (Cu). In one embodiment, the metallic electrode material that provides the top electrode 24 may be the same as the metallic electrode material that provides the bottom electrode 12. In another embodiment, the metallic electrode material that provides the top electrode 24 may be different from the metallic electrode material that provides the bottom electrode 12. The top electrode 24 may be formed utilizing one of the deposition processes mentioned above for forming the bottom electrode 12. The top electrode 24 may have a thickness within the range mentioned above for the bottom electrode 12.

Figure 7:
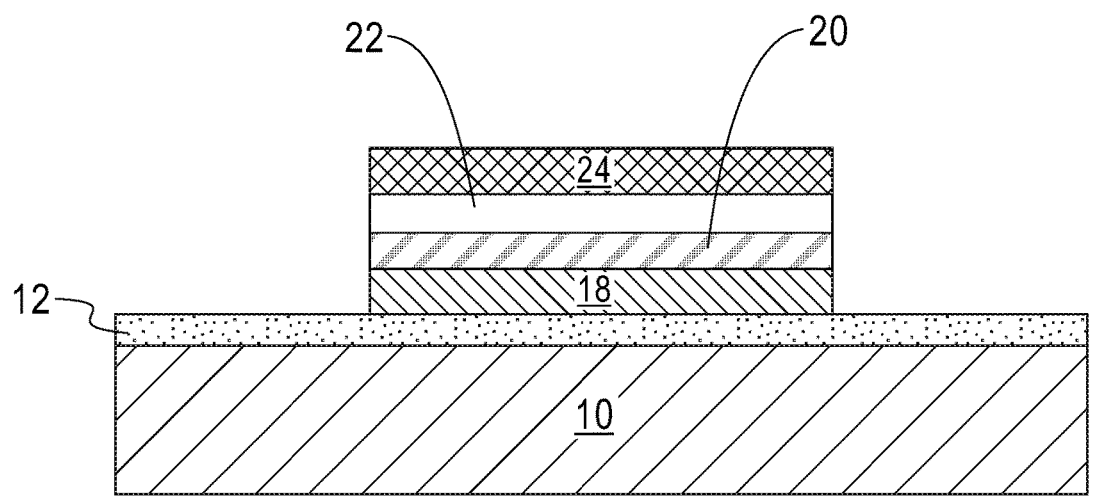
FIG. 7 is a cross sectional view of the exemplary structure of FIG. 6 after performing a lift-off process in which the patterned sacrificial material and all materials formed thereon are removed from the bottom electrode, while maintaining a material stack on the bottom electrode.

Referring now to FIG. 7, there is illustrated the exemplary structure of FIG. 6 after performing a lift-off process in which the patterned sacrificial material 14 and all materials formed thereon are removed from the bottom electrode 12, while maintaining a material stack on the bottom electrode 12. The material stack includes a remaining portion of each of the lithiated cathode material layer 18, the lithium-based solid-state electrolyte layer 20, the lithium nucleation enhancement liner 22 and the top electrode 24. The material stack is located on the physically exposed portion of the bottom electrode 12.

In one embodiment, the lift-off process includes removing the patterned sacrificial material 14 utilizing a solvent or etchant that is selective for removing the sacrificial material. In another embodiment, the removing does not include the use of a solvent, but instead, the mechanical force is released or release occurs by peeling the patterned sacrificial material 14 from the removable adhesive.

The exemplary structure shown in FIG. 7 illustrates a solid-state lithium-based battery in accordance with the present application. The solid-state lithium-based battery includes a bottom electrode 12, and a battery material stack (18, 20, 22) located on a portion of the surface of the bottom electrode 12. The battery material stack (18, 20, 22) includes lithiated cathode material layer 18, lithium-based solid-state electrolyte layer 20 located on the lithiated cathode material layer 18, and lithium nucleation enhancement liner 22. A top electrode 24 is located on the lithium nucleation enhancement liner 22 of the battery material stack (18, 20, 22). The solid-state lithium-based battery of the present application has a fast charge rate. In some embodiments, the solid-state lithium-based battery has a charge rate of greater than 3 C, wherein C is the total battery capacity per hour.

As shown in FIG. 7, the lithiated cathode material layer 18, the lithium-based solid-state electrolyte layer 22 and the lithium nucleation enhancement liner 22 of the solid-state lithium-based battery have sidewall surfaces that are vertically aligned with each other. As is further shown, the top electrode 24 of the solid-state lithium-based battery has sidewall surfaces that are vertically aligned to the sidewall surfaces of the lithiated cathode material layer 18, the lithium-based solid-state electrolyte layer 20, and the lithium nucleation enhancement liner 22 of the solid-state lithium-based battery.

Figure 8:
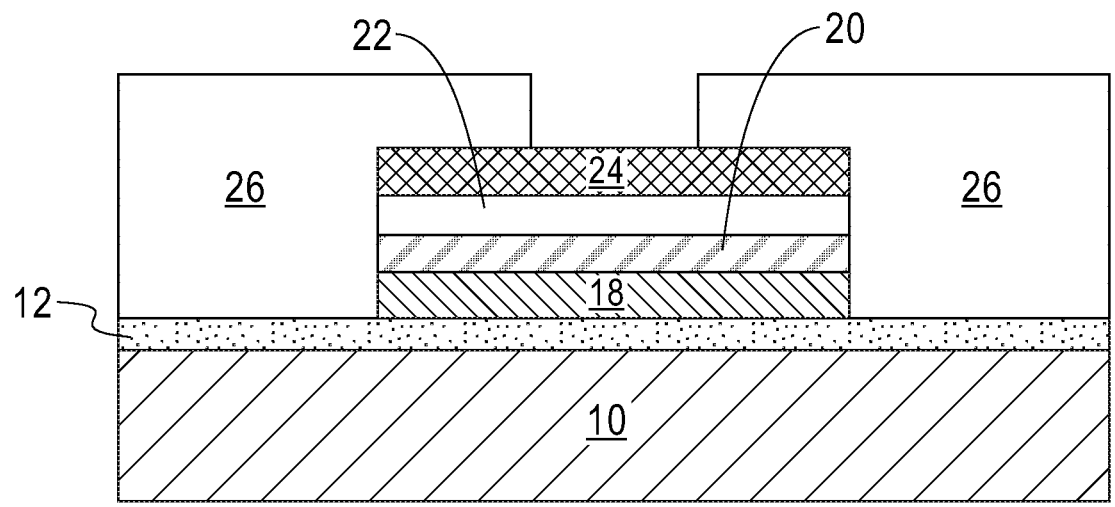
FIG. 8 is a cross sectional view of the exemplary structure of FIG. 7 after forming an air and/or moisture impermeable structure.

Referring now to FIG. 8, there is illustrated the exemplary structure of FIG. 7 after forming an air and/or moisture impermeable structure 26. The air and/or moisture impermeable structure 26 includes any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The air and/or moisture impermeable structure 26 may be formed by first depositing the air and/or moisture impermeable material and thereafter patterning the air and/or moisture impermeable material. In one embodiment, patterning may be performed by lithography and etching.

The battery shown in FIG. 8 may now be subjected to a charging/recharging process. Charging/recharging may be performed utilizing conventional techniques well known to those skilled in the art. For example, the solid-state lithium-based battery of the present application can be charged/recharged by connecting the solid-state lithium-based battery of the present application to an external power supply.

Figure 9:
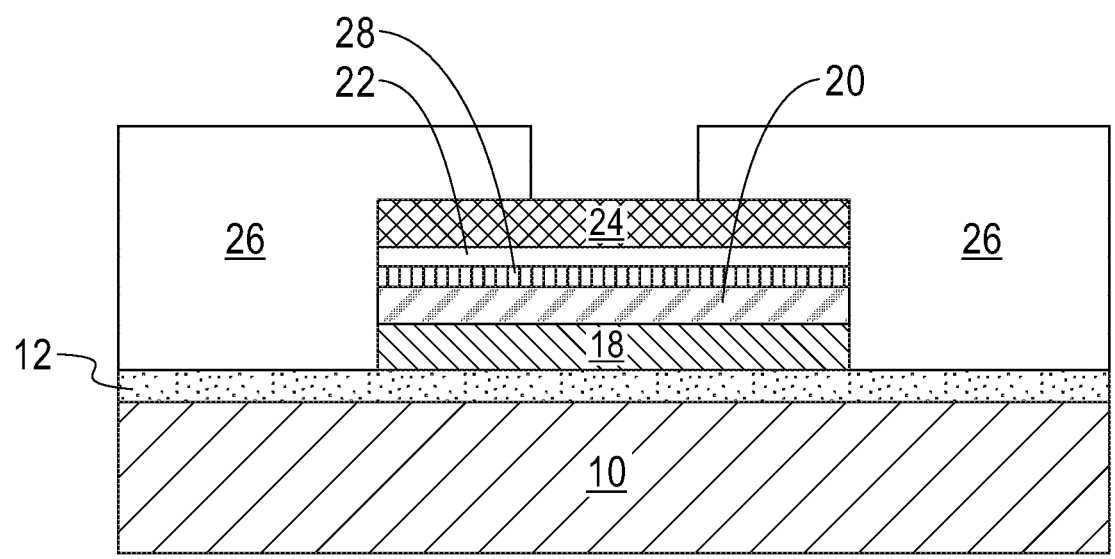
FIG. 9 is a cross sectional view after charging the resultant structure shown in FIG. 8.

During charging/recharging, a lithium accumulation region is formed on at least one (topmost and/or bottommost) surface of the lithium nucleation enhancement liner. In one example and as shown in FIG. 9, a lithium accumulation region 28 is formed between the lithium-based solid-state electrolyte layer 20 and the lithium nucleation enhancement liner 22 of the battery material stack (18, 20, 22) and the top electrode 24; during the charging/recharging process the thickness of the originally formed lithium-based solid-state electrolyte layer 20 and the lithium nucleation enhancement liner 22 may be reduced. Also and during the charging/recharging process, the lithium nucleation enhancement liner 22 may, or may not, be alloyed with some lithium. Collectively, the lithium accumulation region 28 and the lithium nucleation enhancement liner 22 provide an anode structure of the present application. In another example, not shown, but readily understood by one skilled in the art, a lithium accumulation region is formed between the lithium nucleation enhancement liner and the top electrode. In yet a further example, not shown, but readily understood by one skilled in the art, a first lithium accumulation region is formed between the lithium-based solid-state electrolyte layer and the lithium nucleation enhancement liner and a second lithium accumulation region is formed between the lithium nucleation enhancement liner and the top electrode.

In some embodiments, the lithium accumulation region 28 is continuously present on at least one surface of the lithium nucleation enhancement liner 22. In other embodiments (not shown), the lithium accumulation region 28 may exist as discrete islands, i.e., the lithium accumulation region 28 is discontinuously present on at least one surface of the lithium nucleation enhancement liner. In some embodiments, a first lithium accumulation region is continuously present on a first surface of the lithium nucleation enhancement liner, and a second lithium accumulation region is present as discrete islands on a second surface of the lithium nucleation enhancement liner. The density of these discrete islands is reduced, by as much as 80 percent or more, compared to a conventional solid-state lithium based battery that includes the same components except for the absence of the lithium nucleation enhancement liner 22.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A solid-state lithium-based battery comprising:
    a bottom electrode;
    a battery material stack located only on a portion of the bottom electrode, wherein the battery material stack includes a lithiated cathode material layer, a lithium-based solid-state electrolyte layer located on the lithiated cathode material layer, and an anode structure consisting of a lithium nucleation enhancement liner composed of a titanium-zirconium-molybdenum alloy (TZM), and a lithium accumulation region composed of lithium nucleated by the lithium nucleation enhancement liner during a charging process, wherein the lithium accumulation region is located on a topmost surface of the lithium nucleation enhancement liner that is opposite a bottommost surface of the lithium nucleation enhancement liner that forms an interface directly with the lithium-based solid-state electrolyte;
    a top electrode located on a topmost surface of the battery material stack; and
    an air and/or moisture impermeable structure located directly on other portions of the bottom electrode not containing the battery material stack, wherein the air and/or moisture impermeable structure directly contacts an entirety of an outermost sidewall of the battery material stack and directly contacts a portion of a topmost surface of the top electrode.

2. The solid-state lithium-based battery of claim 1, wherein the lithiated cathode material layer, the lithium-based solid-state electrolyte layer, and the lithium nucleation enhancement liner have sidewall surfaces that are vertically aligned with each other.

3. The solid-state lithium-based battery of claim 2, wherein the top electrode has sidewall surfaces that are vertically aligned to the sidewall surfaces of the lithiated cathode material layer, the lithium-based solid-state electrolyte layer, and the lithium nucleation enhancement liner.

4. The solid-state lithium-based battery of claim 1, wherein the lithiated cathode material layer is composed of $LiCoO_2$, and the lithium-based solid-state electrolyte layer is composed of LiPON.

5. The solid-state lithium-based battery of claim 1, wherein the lithium accumulation region is continuously located on the topmost surface of the lithium nucleation enhancement liner.

6. The solid-state lithium-based battery of claim 1, wherein the lithium accumulation region is discontinuously located on the topmost surface of the lithium nucleation enhancement liner.

7. The solid-state lithium-based battery of claim 1, further comprising a substrate located beneath the bottom electrode.

8. The solid-state lithium-based battery of claim 1, wherein the battery has a charge rate of greater than 3 C, wherein C is the total battery capacity per hour.

9. The solid-state lithium-based battery of claim 1, wherein the battery has a thickness of 100 μm or less.

10. A solid-state lithium-based battery comprising:
    a bottom electrode;
    a battery material stack located on a surface of the bottom electrode, wherein the battery material stack includes a lithiated cathode material layer, a lithium-based solid-state electrolyte layer located on the lithiated cathode material layer, and an anode structure consisting of a lithium nucleation enhancement liner composed of a titanium-zirconium-molybdenum alloy (TZM), a first lithium accumulation region composed of lithium nucleated by the lithium nucleation enhancement liner during a charging process located on a bottommost surface of the lithium nucleation enhancement liner, and a second lithium accumulation region composed of lithium nucleated by the lithium nucleation enhancement liner during the charging process located on a topmost surface of the lithium nucleation enhancement liner;
    a top electrode located on a topmost surface of the battery material stack; and
    an air and/or moisture impermeable structure located directly on other portions of the bottom electrode not containing the battery material stack, wherein the air and/or moisture impermeable structure directly contacts an entirety of an outermost sidewall of the battery material stack and directly contacts a portion of a topmost surface of the top electrode.

11. A solid-state lithium-based battery comprising:
    a bottom electrode;
    a battery material stack located a surface of the bottom electrode, wherein the battery material stack includes a lithiated cathode material layer, a lithium-based solid-state electrolyte layer located on the lithiated cathode material layer, and a lithium nucleation enhancement liner, wherein the lithium nucleation enhancement liner is composed of a titanium-zirconium-molybdenum alloy (TZM); and
    a top electrode located on the lithium nucleation enhancement liner of the battery material stack.

* * * * *